(No Model.)

S. H. HUNTINGTON.
GRATE FOR FURNACES.

No. 352,692. Patented Nov. 16, 1886.

WITNESSES:
Otto Beyer
C. Sedgwick

INVENTOR:
S. H. Huntington
BY Munn & Co
ATTORNEYS.

UNITED STATES PATENT OFFICE.

SILAS HYDE HUNTINGTON, OF WEST PITTSTON, PENNSYLVANIA.

GRATE FOR FURNACES.

SPECIFICATION forming part of Letters Patent No. 352,692, dated November 16, 1886.

Application filed November 3, 1885. Serial No. 181,755. (No model.)

*To all whom it may concern:*

Figure 2:
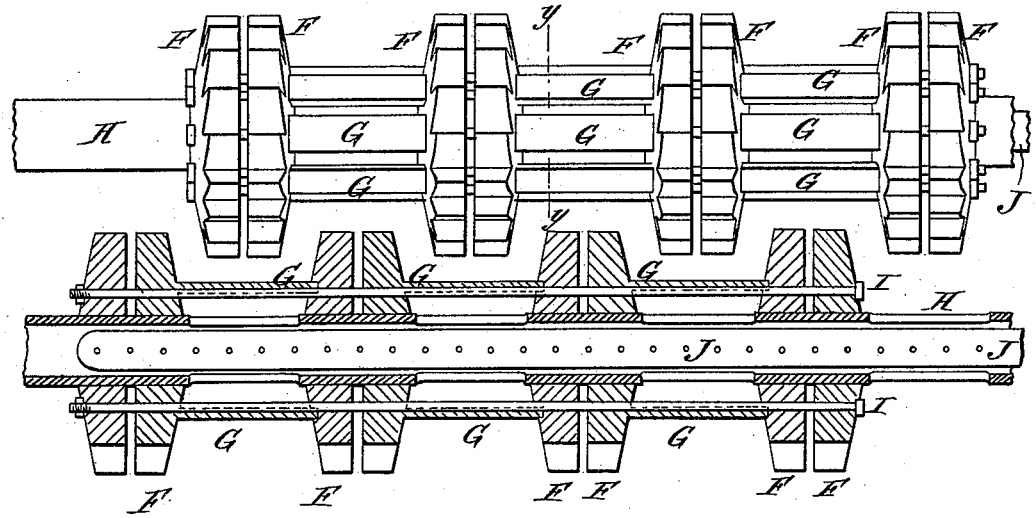
Figure 1:
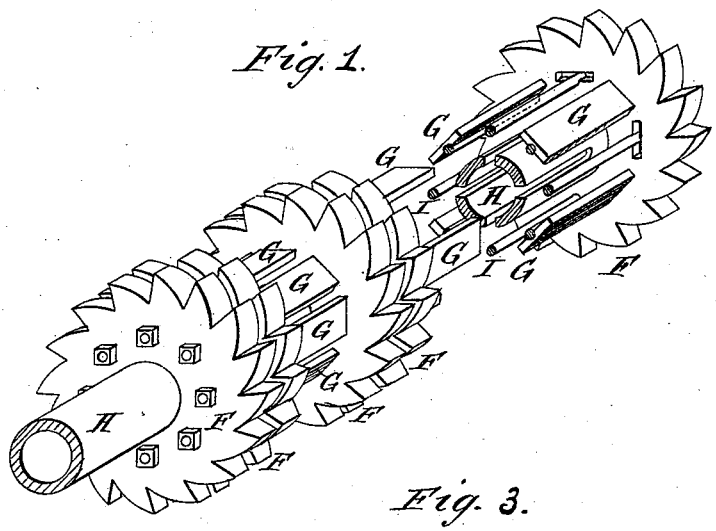
Figure 3:
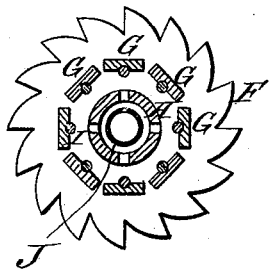

Be it known that I, SILAS HYDE HUNTINGTON, of West Pittston, in the county of Luzerne and State of Pennsylvania, have invented a new and useful Improvement in Grates for Furnaces, of which the following is a specification, reference being had to the annexed drawings, forming a part thereof, in which—
Figure 1 is a perspective view, partly in section, of my improved grate-bar. Fig. 2 is a plan view, partly in section, showing two of the improved grate-bars as arranged in a grate; and Fig. 3 is a transverse section taken on the line *x x* of Fig. 2.
My invention consists in the construction and arrangement of parts, as will be hereinafter fully described and claimed.
In my improved construction I form the sections of toothed end pieces, F, and bars G, cast integrally therewith, the bars G of one section alternating with the bars G of the adjoining section, the ends of the bars being received in mortises in the sides of the toothed wheels F. Each section of this grate-bar is therefore made up of two wheels, F, and the bars G, projecting therefrom and inserted each in the mortises of the other wheels. The grate-bar is formed of a series of such sections placed on a hollow slotted shaft, H, and secured together by bolts I, passing through the entire series of sections, or in any other convenient way. The teeth of the wheels F are inclined in one direction, as in a ratchet-wheel. The bolts which hold the series of sections together pass underneath the bars G. The pipe J, inserted in the hollow shaft H, extends through the entire series of sections of the grate-bar, and is apertured to permit of the escape of the water therefrom to the interior of the bar, to keep the bar cool and to furnish a certain amount of steam to the fire to improve the combustion and economize fuel.

A portion of a grate formed by a series of grate-bars of this kind is shown in Fig. 2. It will there be seen that the wheels F of adjacent bars alternate with each other, leaving space for the escape of ashes and clinkers, as in the other case. The clinkers are ground up and removed by the rotation of the wheels F and of the bars G.

Having thus described my invention, what I claim as new, and desire to secure by Letters Patent, is—

1. The combination, in a grate-bar, of toothed wheels F, provided with bars G and mortises for receiving the bars of the adjoining section, hollow shaft H, and fastening-bolts I, substantially as herein specified.

2. The combination, in a grate-bar, of the hollow shaft H, the toothed wheels F, provided with the bars G, and the perforated tube J, inserted in the tube H, substantially as herein specified.

3. In a grate-bar, the combination, with the hollow slotted shaft H, of toothed wheels F, provided with bars G, projecting from the side thereof, and provided with mortises in the side thereof, alternating with the bars G, for receiving the bars G of the adjoining wheels F, and bolts I, extending through the entire series of sections formed of toothed wheels F and bars G underneath the bars G, substantially as herein specified.

SILAS HYDE HUNTINGTON.

Witnesses:
F. H. KYTE,
S. P. FENN.